United States Patent Office 3,434,916
Patented Mar. 25, 1969

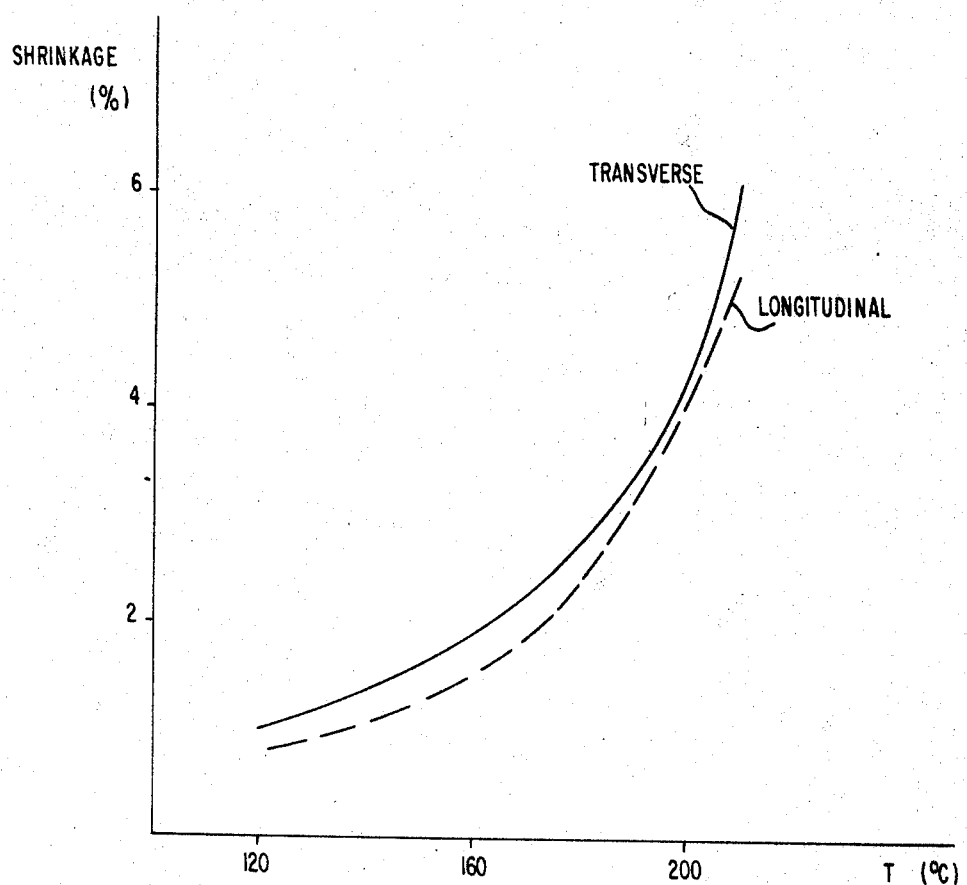

3,434,916
MANUFACTURE OF POLYETHYLENE
TEREPHTHALATE LAMINATES
Herbert Braunisch, Wiesbaden-Biebrich, Helga Lenhart, Wiesbaden, and Walter Seifried, Wiesbaden-Biebrich, Germany, assignors to Kalle Aktiengesellschaft, Wiesbaden-Biebrich, Germany, a corporation of Germany
Filed June 1, 1965, Ser. No. 460,131
Claims priority, application Germany, June 4, 1964,
K 53,130
Int. Cl. B32b 27/36, 27/06
U.S. Cl. 161—231                     12 Claims

ABSTRACT OF THE DISCLOSURE

This invention relates to a process for the manufacture of polyethylene terephthalate laminates by superposing one surface provided with an adhesive substance upon another surface and bonding the surfaces together by the application of pressure and heat, wherein the adhesive substance is maleic anhydride, phthalic anhydride, tetrahydrophthalic anhydride, hexahydrophthalic anhydride, benzoic anhydride, a mixture of slower-reacting carboxylic anhydrides and maleic anhydride, a mixture of slower-reacting carboxylic anhydrides and phthalic anhydride, benzaldehyde, 1-naphthaldehyde, phthalaldehyde, or terephthalaldehyde or mixtures thereof.

This invention is concerned with the manufacture of polyethylene terephthalate laminates, especially of biaxially stretched polyethylene terephthalate films.

Polyethylene terephthalate displays a high degree of resistance to solvents. It is therefore very difficult to obtain good adhesion between two sheets of this material or between a sheet of this material and another material, especially when the laminate itself is to be impervious to attack by solvents of good dissolving capacity, for example methylene chloride.

The single-component and two-component adhesives at present used are not stable towards a number of halogenated hydrocarbons. Furthermore, most of them display low bonding power, and even this generally diminishes rapidly with increasing temperature.

The process of swelling the surfaces of polyethylene terephthalate films with the aid of suitable organic substances, for example benzyl alcohol and anisole, and subsequently bonding them under pressure at a raised temperature (121–138° C.) is known. However, the adhesion obtained by this method is very poor owing to the low swelling capacity of the material, and is inadequate for most purposes.

A further process consists in slightly hydrolizing the polyester surfaces with trichloroacetic acid and bonding under pressure at a raised temperature. Since polyethylene terephthalate is to a large extent resistant to a trichloroacetic acid treatment of reasonably short duration, adhesion in this case is also relatively low. Furthermore, trichloroacetic acid is highly corrosive and injurious to health.

It is also known to treat polyethylene terephthalate films with methyl derivatives of bicyclo-(2,2,1)-heptene-2,3-dicarboxylic anhydride and subsequently to bond them under slight pressure at a temperature of about 204° C. Although the laminate so obtained displays good bond strength, the film shrinks, generally leading to the production of an unsightly, corrugated product, at the necessarily high temperature at which the process is carried out. Furthermore, in the case of biaxially stretched films, the degree of orientation originally imparted to the material is reduced to a certain extent, which results in a loss of strength.

The relationship between temperature and shrinkage in this case is shown in the single figure of the accompanying drawing.

The present invention provides a process for the manufacture of polyethylene terephthalate laminates by superposing one surface provided with an adhesive substance upon another surface and bonding by the application of pressure and heat, wherein the adhesive substance used consists of one or more compounds of the following group: Maleic anhydride, phthalic anhydride, tetrahydrophthalic anhydride, hexahydrophthalic anhydride, benzoic anhydride, mixtures of slower-reacting carboxylic anhydrides and maleic or phthalic anhydride, benzoic acid, 1-naphthoic acid, benzaldehyde, 1-naphthaldehyde, phthalaldehyde and terephthalaldehyde, and bonding is carried out at a temperature of 150–190° C., preferably 160–180° C., for a period up to one minute, preferably from 1 to 30 seconds, and under a pressure sufficient to keep the surfaces in contact. Biaxially stretched polyethylene terephthalate films are more especially concerned.

In cases where liquid compounds or solutions of solid compounds are used for bonding, they are applied as evenly as possible in known manner to one or both of the surfaces to be bonded. One of the known coating systems (for example, the air-knife system), which ensures evenness of application, can be used, when bonding travelling film webs. Solid compounds can be sprinkled on to a surface in a state of fine division or, as stated, they can be dissolved in a solvent and then applied; in the latter case, the solvent must be evaporated before the films are united. Compounds having a low melting point can be melted by a heating means forming part of the coating apparatus and applied in the molten state. The surfaces or films are united and then heated under pressure until reaction commences.

In accordance with the invention, as indicated, the compounds forming the bond may be used either singly or in admixture one with another. Mixtures comprising hexahydrophthalic anhydride and maleic anhydride and/or phthalic anhydride have been found to be especially advantageous. However, as also indicated above, in accordance with the invention the activity of slower-reacting carboxylic anhydrides, for example, dodecenyl-succinic anhydride or the methyl compound of 3,6-endomethylene-Δ⁴-tetrahydrophthalic anhydride, can be increased by the addition of maleic or phthalic anhydride to an extent such that these carboxylic anhydrides have an effect comparable to that of others of the compounds set forth above.

The laminates are manufactured in accordance with the process of the invention using compounds as specified that are easily obtainable and they display high bond strength and are resistant to solvents and heat. The low operating temperature, as compared with the known processes, ensures that shrinkage and the corrugation associated therewith and also, in the case of stretched films, reduction in orientation and strength are avoided to a large extent.

The following examples illustrate the invention:

EXAMPLE 1

Biaxially stretched and heat-set polyethylene terephthalate film is coated with maleic anhydride, pressed on to a second polyethylene terephthalate film, and the composite material is heated for 10 seconds at 170° C. under light pressure. The laminate so obtained displays high bond strength and is resistant to solvents.

EXAMPLE 2

Film of the kind described in Example 1 is coated with phthalic anhydride, pressed on to a second film, and the composite material is heated for 10 seconds at 160° C. under pressure.

EXAMPLE 3

Bonding of the polyethylene terephthalate films is carried out in the manner described in Example 1 with the exception that hexahydrophthalic anhydride is used as intermediate substance and the composite material is subsequently heated for 10 seconds at 180° C. under pressure.

EXAMPLE 4

Bonding of the polyethylene terephthalate films is carried out in the manner described in Example 1 with the exception that benzoic acid is used as intermediate substance and the composite material is subsequently heated for 10 seconds at 170° C. under pressure.

EXAMPLE 5

Bonding of the polyethylene terephthalate films is carried out in the manner described in Example 1 with the exception that 1-naphthoic acid is used as intermediate substance and the composite material is subsequently heated under pressure either for 30 seconds at 170° C. or for 10 seconds at 180° C.

EXAMPLE 6

Bonding of the polyethylene terephthalate films is carried out in the manner described in Example 1 with the exception that benzaldehyde is used as intermediate substance and the composite material is subsequently heated for 10 seconds at 170° C. under pressure.

EXAMPLE 7

Bonding of the polyethylene terephthalate films is carried out in the manner described in Example 1 with the exception that 1-naphthaldehyde is used as intermediate substance and the composite material is subsequently heated for 10 seconds at 180° C. under pressure.

EXAMPLE 8

Bonding of the polyethylene terephthalate films is carried out in the manner described in Example 1 with the exception that phthalaldehyde is used as intermediate substance and the composite material is subsequently heated for 10 seconds at 170° C. under pressure.

EXAMPLE 9

Bonding of the polyethylene terephthalate films is carried out in the manner described in Example 1 with the exception that terephthalaldehyde is used as intermediate substance and the composite material is subsequently heated for 10 seconds at 170° C. under pressure.

EXAMPLE 10

A film of the kind described in Example 1 is coated with a 1:3 mixture of dodecenylsuccinic anhydride and maleic anhydride, pressed on to a second film, and the composite material is heated for 10 seconds at 180° C. under pressure.

EXAMPLE 11

A film of the kind described in Example 1 is coated with a 1:1 mixture of hexahydrophthalic anhydride and maleic anhydride, pressed on to a second film, and the composite material is heated for 10 seconds at 170° C. under pressure.

EXAMPLE 12

A film of the kind described in Example 1 is coated with a 1:1 mixture of hexahydrophthalic anhydride and phthalic anhydride, pressed on to a second film, and the composite material is heated for 10 seconds at 170° C. under pressure.

It will be obvious to those skilled in the art that many modifications may be made within the scope of the present invention without departing from the spirit thereof, and the invention includes all such modifications.

What is claimed is:

1. A process for the manufacture of polyethylene terephthalate laminates by superposing one surface provided with an adhesive substance upon another surface and bonding the surfaces together by the application of pressure and heat, wherein the adhesive substance employed is at least one compound selected from the group consisting of maleic anhydride, phthalic anhydride, tetrahydrophthalic anhydride, hexahydrophthalic anhydride, benzoic anhydride, a mixture of slower-reacting carboxylic anhydrides and maleic anhydride, a mixture of slower-reacting carboxylic anhydrides and phthalic anhydride, benzaldehyde, 1-naphthaldehyde, phthalaldehyde, and terephthalaldehyde.

2. A process as claimed in claim 1, wherein bonding is carried out under pressure at a temperature of 150–190° C. for a period up to one minute.

3. A process as claimed in claim 1, wherein bonding is carried out under pressure at a temperature of 160–180° C. for a period from 1 to 30 seconds.

4. A process as claimed in claim 1, wherein a mixture consisting of hexahydrophthalic anhydride and maleic anhydride is used.

5. A process as claimed in claim 1, wherein a mixture consisting of hexahydrophthalic anhydride and phthalic anhyride is used.

6. A process as claimed in claim 1, wherein a mixture consisting of hexahydrophthalic anhydride, maleic anhydride, and phthalic anhydride is used.

7. A polyethylene terephthalate laminate prepared by superposing one surface provided with an adhesive substance upon another surface and bonding the surfaces together by the application of pressure and heat, wherein the adhesive substance employed is at least one compound selected from the group consisting of maleic anhydride, phthalic anhydride, tetrahydrophthalic anhydride, hexahydrophthalic anhydride, benzoic anhydride, a mixture of slower-reacting carboxylic anhydrides and maleic anhydride, a mixture of slower-reacting carboxylic anhydrides and phthalic anhydride, benzaldehyde, 1-naphthaldehyde, phthalaldehyde, and terephthalaldehyde.

8. Polyethylene terephthalate laminates as claimed in claim 7, which are bonded together under pressure at a temperature of 150–190° C. for a period up to one minute.

9. Polyethylene terephthalate laminates as claimed in claim 7, which are bonded together under pressure at a temperature of 160–180° C. for a period from 1 to 30 seconds.

10. Polyethylene terephthalate laminates as claimed in claim 7, bonded together with the aid of a mixture consisting of hexahydrophthalic anhydride and maleic anhydride.

11. Polyethylene terephthalate laminates as claimed in claim 7, bonded together with the aid of a mixture consisting of hexahydrophthalic anhydride and phthalic anhydride.

12. Polyethylene terephthalate laminates as claimed in claim 7, bonded together with the aid of a mixture consisting of hexahydrophthalic anhydride, maleic anhydride, and phthalic anhydride.

References Cited

UNITED STATES PATENTS

| | | | |
|---|---|---|---|
| 2,849,359 | 8/1958 | Smith | 161—231 X |
| 3,236,586 | 2/1966 | Humphreys | 156—305 X |

EARL M. BERGERT, *Primary Examiner.*

R. A. KILLWORTH, *Assistant Examiner.*

U.S. Cl. X.R.

156—308